US012753926B2

(12) United States Patent
Asami et al.

(10) Patent No.: US 12,753,926 B2
(45) Date of Patent: Oct. 6, 2026

(54) HEATING COOKING APPARATUS

(71) Applicant: SHARP KABUSHIKI KAISHA, Sakai City (JP)

(72) Inventors: Shinji Asami, Sakai City (JP); Masahiro Nishijima, Sakai City (JP)

(73) Assignee: SHARP KABUSHIKI KAISHA, Sakai City (JP)

( * ) Notice: Subject to any disclaimer, the term of this patent is extended or adjusted under 35 U.S.C. 154(b) by 539 days.

(21) Appl. No.: 18/278,155

(22) PCT Filed: Feb. 21, 2022

(86) PCT No.: PCT/JP2022/006926
§ 371 (c)(1),
(2) Date: Aug. 21, 2023

(87) PCT Pub. No.: WO2022/181538
PCT Pub. Date: Sep. 1, 2022

(65) Prior Publication Data

US 2024/0117969 A1 Apr. 11, 2024

(30) Foreign Application Priority Data

Feb. 25, 2021 (JP) ................................ 2021-028507

(51) Int. Cl.
*F24C 7/02* (2006.01)
*F24C 15/00* (2006.01)
(Continued)

(52) U.S. Cl.
CPC .............. *F24C 7/02* (2013.01); *F24C 15/006* (2013.01); *H05B 6/062* (2013.01); *H05B 6/642* (2013.01); *H05B 6/687* (2013.01)

(58) Field of Classification Search
CPC .......... F24C 7/02; F24C 15/006; H05B 6/642; H05B 6/6423; H05B 6/687
See application file for complete search history.

(56) References Cited

U.S. PATENT DOCUMENTS 2,860,026 A * 11/1958 Long ...................... F24C 15/02 312/139.2
4,162,381 A * 7/1979 Buck ................... H05B 6/6458 426/243

(Continued)

FOREIGN PATENT DOCUMENTS

JP 62-044980 A 2/1987
JP 2010-133634 A 6/2010

*Primary Examiner* — Scott J Walthour
(74) *Attorney, Agent, or Firm* — ScienBiziP, P.C.

(57) ABSTRACT

A heating cooking apparatus includes a heating cooking unit, a microwave supply unit, an air blowing mechanism, and a fixing member. The heating cooking unit includes a heating cooking chamber. The microwave supply unit is fixed to the heating cooking unit and supplies microwaves to the heating cooking chamber. The air blowing mechanism blows air onto the microwave supply unit. The fixing member is fixed to the heating cooking unit. The air blowing mechanism includes a fan, a motor that drives the fan, and a first attachment member disposed on a side, in a predetermined direction, of the fan. The fixing member includes a support portion that supports the first attachment member, and an attachment portion to which the first attachment member is attached.

5 Claims, 12 Drawing Sheets

(51) Int. Cl.

| | |
|---|---|
| ***H05B 6/06*** | (2006.01) |
| ***H05B 6/64*** | (2006.01) |
| ***H05B 6/68*** | (2006.01) |

(56) References Cited

U.S. PATENT DOCUMENTS

| | | | | |
|---|---|---|---|---|
| 4,184,945 | A * | 1/1980 | Morgan ............... | H05B 6/6429 219/757 |
| 4,661,669 | A * | 4/1987 | Matsushima ........ | H05B 6/6411 219/757 |
| 5,869,818 | A * | 2/1999 | Kim ....................... | H05B 6/642 361/720 |
| 8,253,084 | B2 | 8/2012 | Toyoda et al. | |
| 2003/0116561 | A1 * | 6/2003 | Shon .................... | H05B 6/6458 219/707 |
| 2010/0133263 | A1 | 6/2010 | Toyoda et al. | |
| 2012/0187115 | A1 | 7/2012 | Toyoda et al. | |
| 2012/0192725 | A1 | 8/2012 | Toyoda et al. | |

* cited by examiner

HEATING COOKING APPARATUS

TECHNICAL FIELD

The present invention relates to a heating cooking apparatus.

BACKGROUND ART

A heating cooking apparatus including a heating cooking chamber and a pull-out body is known. The pull-out body is integrated with an opening/closing door. The pull-out body is disposed such that the pull-out body can be pulled out from the heating cooking chamber. Such a heating cooking apparatus as described above is built into a cabinet of a built-in kitchen.

PTL 1 discloses a heating cooking apparatus. Heating functions of the heating cooking apparatus disclosed in PTL 1 include a microwave heating function and a high-speed hot air heating function. The microwave heating function is a function of irradiating an object to be heated with microwaves. The high-speed hot air heating function is a function of blowing out hot air at high speed toward an object to be heated.

CITATION LIST

Patent Literature

PTL 1: JP 2010-133634 A

SUMMARY OF INVENTION

Technical Problem

However, with the heating cooking apparatus disclosed in PTL 1, there is a risk that the temperature outside the heating cooking chamber may rise. In particular, there is a risk that the temperature of a microwave supply unit may rise. For this reason, the heating cooking apparatus includes an air blowing mechanism that cools the microwave supply unit using air circulated outside the heating cooking chamber. Further, it is necessary to periodically perform maintenance of the air blowing mechanism and attach the air blowing mechanism to a heating cooking unit such as the heating cooking chamber.

In light of the problem described above, an object of the present invention is to provide a heating cooking apparatus that allows an air blowing mechanism to be easily attached to and detached from a heating cooking unit.

Solution to Problem

According to an aspect of the present invention, a heating cooking apparatus includes a heating cooking unit, a microwave supply unit, an air blowing mechanism, and a fixing member. The heating cooking unit includes a heating cooking chamber. The microwave supply unit is fixed to the heating cooking unit and supplies microwaves to the heating cooking chamber. The air blowing mechanism blows air onto the microwave supply unit. The fixing member is fixed to the heating cooking unit. The air blowing mechanism includes a fan, a motor that drives the fan, and a first attachment member disposed on a side, in a predetermined direction, of the fan. The fixing member includes a support portion that supports the first attachment member, and an attachment portion to which the first attachment member is attached.

Advantageous Effects of Invention

According to a heating cooking apparatus of the present invention, an air blowing mechanism can be easily attached to and detached from a heating cooking unit.

DESCRIPTION OF EMBODIMENTS

Figure 1:
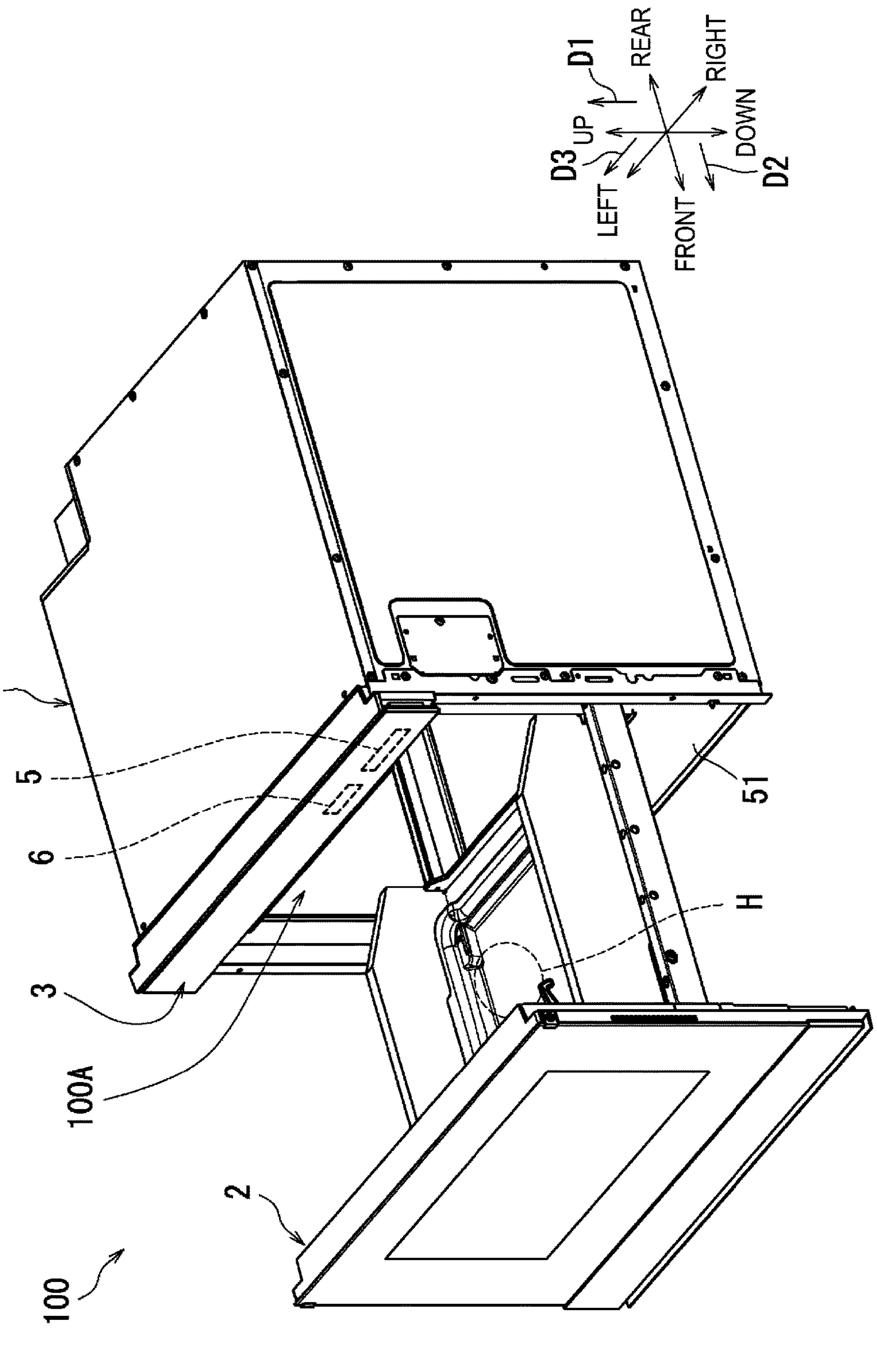
FIG. 1 is a perspective view illustrating a pull-out type heating cooking apparatus according to an embodiment of the present invention.

Hereinafter, embodiments of a pull-out type heating cooking apparatus according to the present invention will be described with reference to the drawings. Note that, in the drawings, the same or equivalent components are denoted by the same reference numerals and signs, and description thereof will not be repeated.

Figure 2:
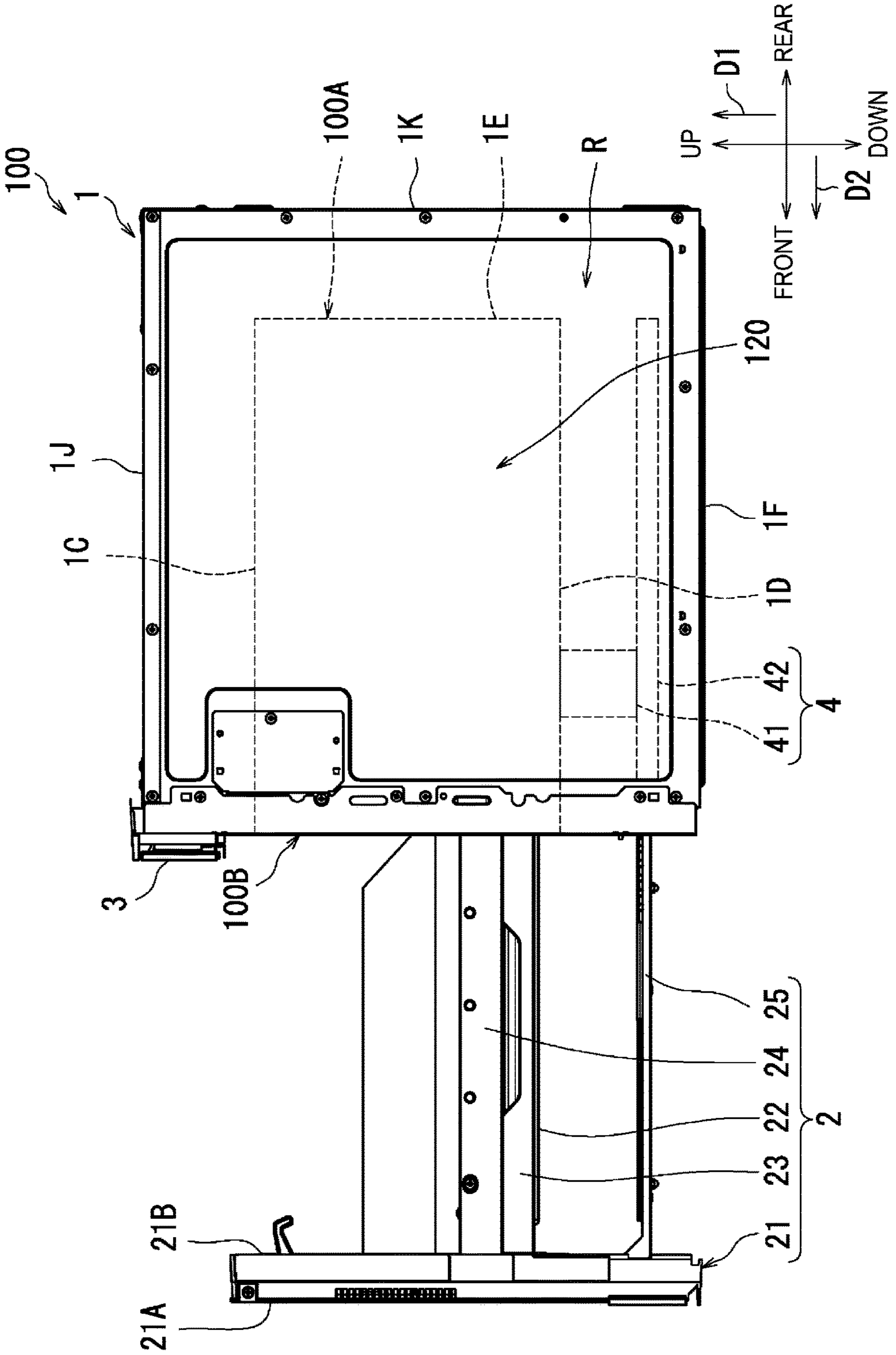
FIG. 2 is a right side view illustrating the pull-out type heating cooking apparatus according to the present embodiment.
Figure 3:
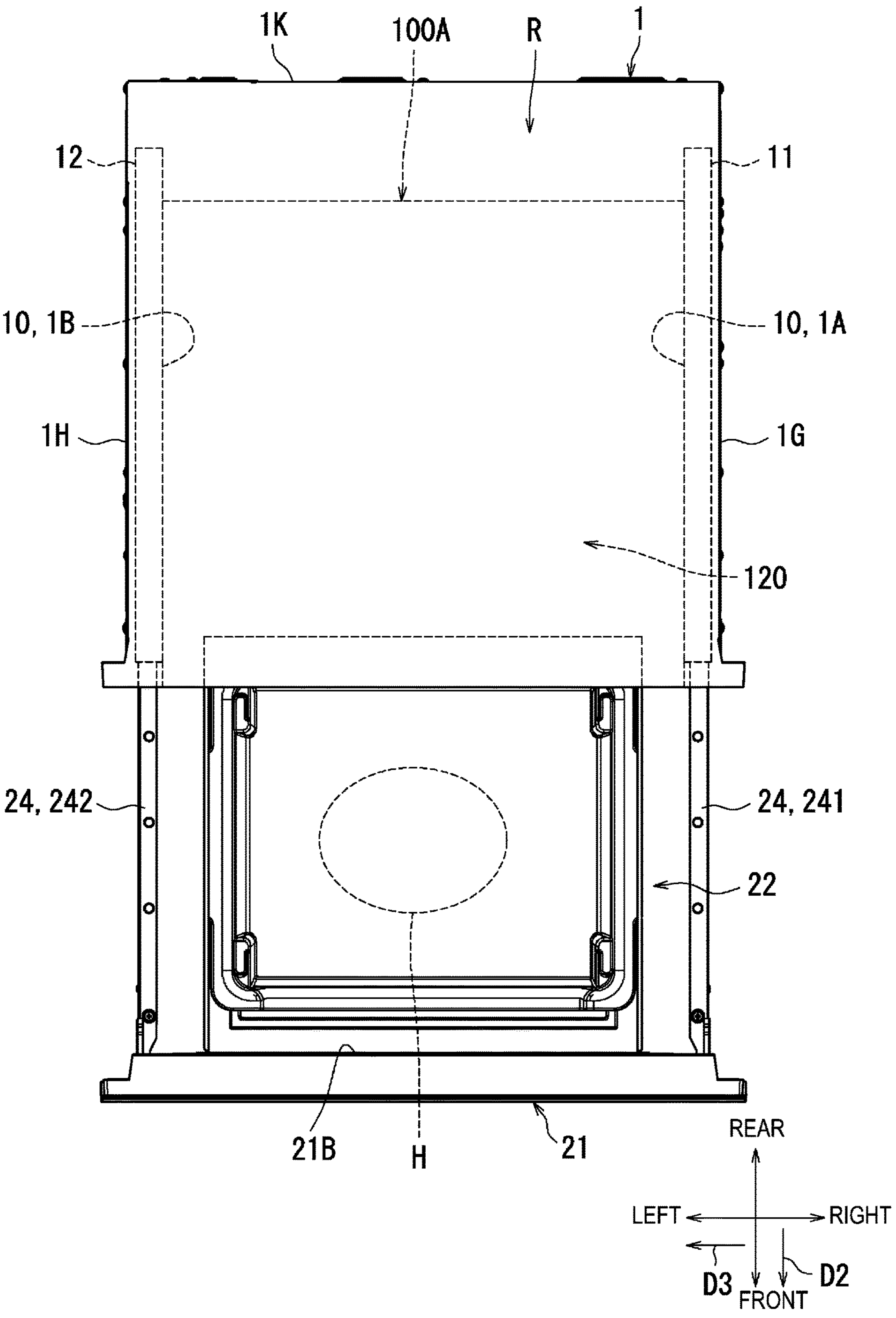
FIG. 3 is a top view illustrating the pull-out type heating cooking apparatus according to the present embodiment.

A pull-out type heating cooking apparatus 100 according to the present embodiment will be described with reference to FIG. 1 to FIG. 3. FIG. 1 is a perspective view illustrating the pull-out type heating cooking apparatus 100. FIG. 2 is a right side view illustrating the pull-out type heating cooking apparatus 100. FIG. 3 is a top view illustrating the pull-out type heating cooking apparatus 100. More specifically, FIG. 1 to FIG. 3 illustrate the pull-out type heating cooking apparatus 100 in a state in which a pull-out body 2 is pulled out. Further, FIG. 1 illustrates an external appearance of the pull-out type heating cooking apparatus 100 as viewed diagonally from the upper front right. The pull-out type heating cooking apparatus 100 is an example of a heating cooking apparatus.

As illustrated in FIG. 1, the pull-out type heating cooking apparatus 100 heats and cooks an object H to be heated. The object H to be heated is, for example, a food product. The pull-out type heating cooking apparatus 100 includes a heating chamber 1, the pull-out body 2, an operation panel 3, a panel 51, a control unit 5, and a storage unit 6. The heating chamber 1 is an example of a "heating cooking unit".

In the present embodiment, a side at which the operation panel 3 of the pull-out type heating cooking apparatus 100 is disposed is defined as a front side of the pull-out type heating cooking apparatus 100, and a side opposite to the front side (rear face side) is defined as a rear side of the pull-out type heating cooking apparatus 100. Further, a right side when the pull-out type heating cooking apparatus 100 is viewed from the front side is defined as a right side of the pull-out type heating cooking apparatus 100, and a side opposite to the right side is defined as a left side of the pull-out type heating cooking apparatus 100. Further, in a direction orthogonal to a front-rear direction and a left-right direction of the pull-out type heating cooking apparatus 100, a side at which the operation panel 3 is disposed is defined as an upper side of the pull-out type heating cooking apparatus 100, and a side opposite to the upper side (bottom side) is defined as a lower side of the pull-out type heating cooking apparatus 100. Note that these orientations do not limit an orientation of the pull-out type heating cooking apparatus 100 according to the present invention in use. In the present embodiment, a first direction D1 is the upward direction (the direction opposite to the vertical direction).

As illustrated in FIG. 1 to FIG. 3, the heating chamber 1 is a box-like member. Specifically, the heating chamber 1 includes a right outer wall 1G, a left outer wall 1H, a top outer wall 1J, a bottom outer wall 1F, and a back outer wall 1K. Then, the heating chamber 1 further includes a heating cooking chamber 100A. The heating cooking chamber 100A is positioned inside the heating chamber 1.

The pull-out body 2 can be pulled out from the heating cooking chamber 100A. Specifically, the pull-out body 2 can be pulled out from the heating cooking chamber 100A along a second direction D2. The second direction D2 intersects the first direction D1. In the present embodiment, the second direction D2 is orthogonal to the first direction D1. The second direction D2 is the forward direction.

The heating cooking chamber 100A includes a placing space 120 that accommodates the object H to be heated. The shape of the heating cooking chamber 100A is, for example, a substantially rectangular parallelepiped shape. The front side of the heating cooking chamber 100A is opened for inserting and removing the object H to be heated. Specifically, the heating cooking chamber 100A includes a pair of side wall portions 10, a back wall 1E, and an opening portion 100B. The pair of side wall portions 10 face each other in a third direction D3. A third direction D3 is an example of a "predetermined direction". The third direction D3 is the leftward direction. Specifically, the pair of side wall portions 10 includes a right wall 1A and a left wall 1B. The back wall 1E intersects the second direction D2. The opening portion 100B faces the back wall 1E. The opening portion 100B communicates with the outside of the heating cooking chamber 100A. The heating cooking chamber 100A further includes a top wall 1C and a bottom wall 1D. Materials of the right wall 1A, the left wall 1B, the top wall 1C, the bottom wall 1D, and the back wall 1E are, for example, a metal.

The heating chamber 1 further includes a space R between the heating chamber 1 and the heating cooking chamber 100A. Specifically, the heating chamber 1 further includes the space R between the bottom wall 1D and the bottom outer wall 1F. The distance between the bottom wall 1D and the bottom outer wall 1F is, for example, 10 cm. The heating chamber 1 further includes the space R between the right wall 1A and the right outer wall 1G. The heating chamber 1 further includes the space R between the left wall 1B and the left outer wall 1H. The heating chamber 1 further includes the space R between the top wall 1C and the top outer wall 1J. The heating chamber 1 further includes the space R between the back wall 1E and the back outer wall 1K.

Once again, as illustrated in FIG. 1, the panel 51 is a plate-like member having a rectangular ring shape. The panel 51 is disposed at the outer periphery of the opening portion 100B, inside the heating chamber 1.

The operation panel 3 includes an operation unit and a display unit. The operation unit receives an operation from a user. The operation unit includes various types of keys. The display unit displays various pieces of information. The display unit includes a liquid crystal panel. The operation panel 3 is positioned at an upper portion of a front face of the heating chamber 1.

The storage unit 6 is constituted by a random access memory (RAM) and a read only memory (ROM). The storage unit 6 stores a control program for controlling an operation of each unit of the pull-out type heating cooking apparatus 100. The storage unit 6 stores setting information input when the operation panel 3 is operated.

The control unit 5 is a hardware circuit that includes a processor such as a central processing unit (CPU). The control unit 5 executes the control program stored in the storage unit 6.

The pull-out body 2 can be pulled out from and can be retracted into the heating chamber 1. Specifically, the pull-out body 2 includes a lid portion 21, a placing portion 22, and a support portion 23.

Once again, as illustrated in FIG. 2 and FIG. 3, the lid portion 21 can cause the opening portion 100B on the front side of the heating cooking chamber 100A to be open and closed. The lid portion 21 is a substantially rectangular plate-like member. The lid portion 21 includes a front face 21A and a rear face 21B. The lid portion 21 causes the opening portion 100B on the front side of the heating cooking chamber 100A to be open in a state in which the pull-out body 2 is pulled out from the heating cooking chamber 100A. The lid portion 21 can close the opening portion 100B on the front side of the heating cooking chamber 100A in a state in which the pull-out body 2 is retracted into the heating cooking chamber 100A.

The object H to be heated can be placed on the placing portion 22. Specifically, the placing portion 22 has a placing surface on which the object H to be heated is placed. The material of the placing portion 22 is a non-metal, and is preferably ceramic or glass, for example. As a result, the placing portion 22 transmits microwaves.

The support portion 23 is fixed to the rear face 21B of the lid portion 21 and supports a peripheral edge portion of the placing portion 22 such that the placing portion 22 is held in a horizontal state. The material of the support portion 23 is, for example, a metal.

Then, the placing portion 22 and the support portion 23 are pulled out from the inside of the heating cooking chamber 100A to the outside by the pull-out body 2 being pulled out. The placing portion 22 and the support portion 23 are accommodated in the heating cooking chamber 100A in a state in which the pull-out body 2 is retracted.

The pull-out body 2 further includes a pair of slide members 24 and a support member 25. The pair of slide members 24 extend in the front-rear direction and define the movement direction of the pull-out body 2. The pair of slide members 24 are fixed to the rear face 21B of the lid portion 21. Specifically, one slide member of the pair of slide members 24 includes a right side slide member 241, and the other slide member of the pair of slide members 24 includes a left side slide member 242. Each of the right side slide member 241 and the left side slide member 242 is, for example, a member having the front-rear direction as a longitudinal direction. The right side slide member 241 and the left side slide member 242 face each other in the left-right direction. One end portion of the right side slide member 241 is attached to an edge portion on the right side of the rear face 21B of the lid portion 21. One end portion of the left side slide member 242 is attached to an edge portion on the left side of the rear face 21B of the lid portion 21.

Meanwhile, the heating chamber 1 further includes a right side slide rail 11 and a left side slide rail 12. The right side slide rail 11 is fixed on the right wall 1A in the space R between the right wall 1A and the right outer wall 1G. The left side slide rail 12 is fixed on the left wall 1A in the space R between the left wall 1B and the left outer wall 1H. Each of the right side slide rail 11 and the left side slide rail 12 is a member having the front-rear direction as a longitudinal direction. The right side slide member 241 is slidably supported by the right side slide rail 11. The left side slide member 242 is slidably supported by the left side slide rail 12.

The support member 25 supports the lid portion 21. More specifically, the support member 25 extends in the direction opposite to the second direction D2 and defines the movement direction of the pull-out body 2. One end portion of the support member 25 is attached to a center portion in the left-right direction of the rear face 21B of the lid portion 21 and below the placing portion 22. The support member 25 is, for example, a plate-like member having the front-rear direction as a longitudinal direction. The support member 25 includes a rack portion. The rack portion includes a plurality of teeth. The support member 25 may be a single plate-like member or a plurality of plate-like members.

Meanwhile, the heating chamber 1 further includes a drive mechanism 4. The drive mechanism 4 drives the support member 25. Then, the drive mechanism 4 is positioned below the heating cooking chamber 100A. Specifically, the drive mechanism 4 is accommodated in the space R between the bottom wall 1D and the bottom outer wall 1F. For example, the drive mechanism 4 includes a drive motor 41, a pinion, and a drive rail 42. The drive rail 42 is fixed in the space R between the bottom wall 1D and the bottom outer wall 1F. The drive rail 42 is a member having the front-rear direction as a longitudinal direction. The support member 25 is slidably supported by the drive rail 42. The pinion is attached to an end portion of the drive motor 41. The pinion engages with the rack portion of the support member 25. Furthermore, the support member 25 moves in the front-rear direction as a result of rotation of the pinion. Note that the drive mechanism 4 may drive at least one of the support member 25, and the right side slide member 241 and the left side slide member 242. Further, in a case where the right side slide member 241 and the left side slide member 242 are driven, the drive mechanism 4 may be positioned on the side of the heating cooking chamber 100A.

Figure 4:
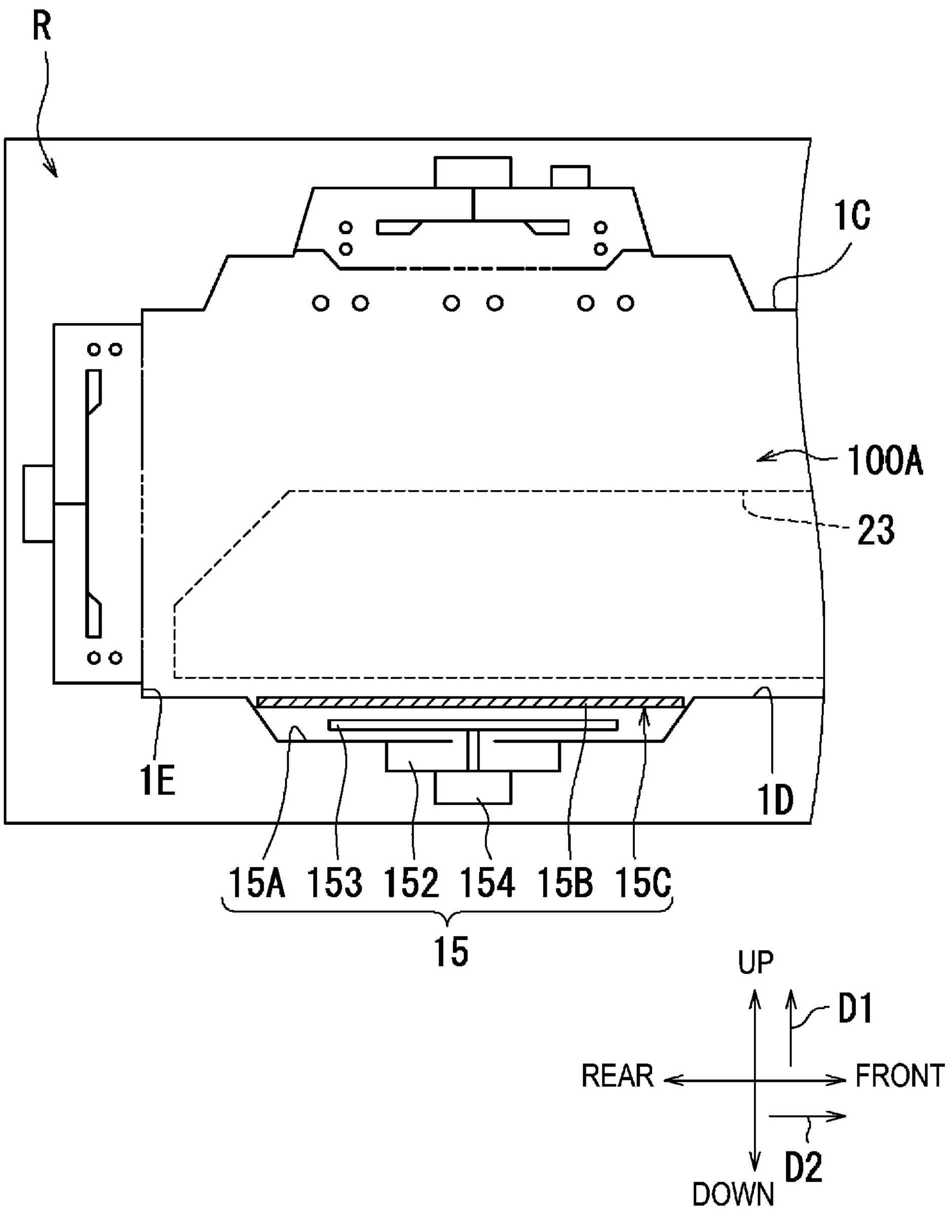
FIG. 4 is a cross-sectional view of a heating chamber taken along a plane orthogonal to a third direction in the pull-out type heating cooking apparatus according to the present embodiment.
Figure 5:
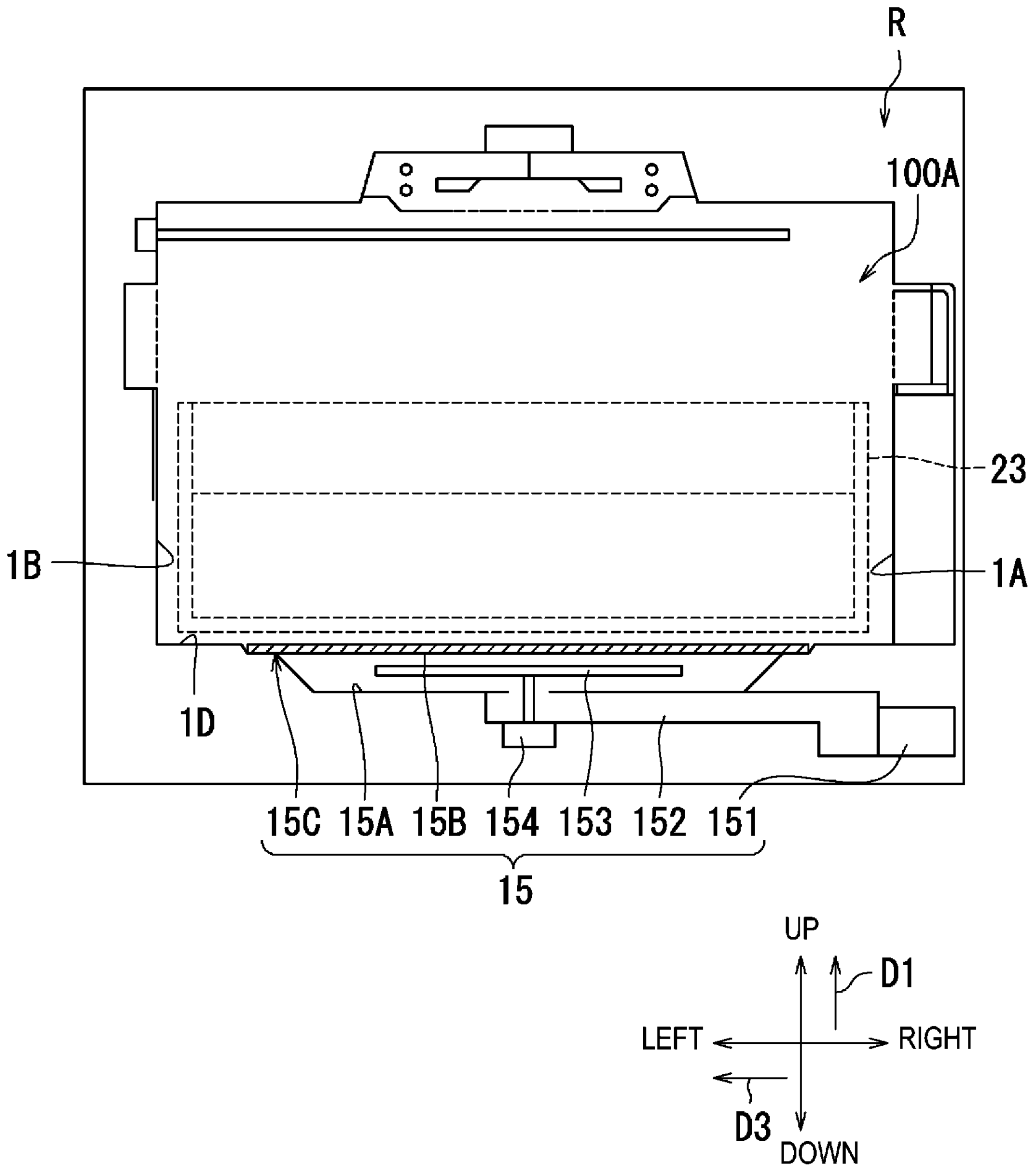
FIG. 5 is a cross-sectional view illustrating the heating chamber taken along a plane orthogonal to a second direction in the pull-out type heating cooking apparatus according to the present embodiment.

Next, the heating chamber 1 will be further described with reference to FIG. 4 and FIG. 5. FIG. 4 and FIG. 5 are schematic cross-sectional views of the heating chamber 1. More specifically, FIG. 4 is a cross-sectional view of the heating chamber 1 taken along a plane orthogonal to the third direction D3. FIG. 5 is a cross-sectional view illustrating the heating chamber 1 taken along a plane orthogonal to the second direction D2.

As illustrated in FIG. 4 and FIG. 5, the pull-out type heating cooking apparatus 100 further includes a microwave supply unit 15. The microwave supply unit 15 supplies microwaves into the heating cooking chamber 100A.

The microwave supply unit 15 is fixed to the heating cooking chamber 100A. Specifically, the microwave supply unit 15 is fixed below the heating cooking chamber 100A. More specifically, the microwave supply unit 15 is positioned outside of the heating cooking chamber 100A via the bottom wall 1D.

Specifically, the microwave supply unit 15 includes a partitioning member 15B, a radiation chamber 15A, a radiation port 15C, a magnetron 151, a waveguide 152, a rotary antenna 153, and an antenna motor 154. The magnetron 151 generates microwaves. The waveguide 152 propagates the microwaves generated by the magnetron 151 to the radiation chamber 15A. The waveguide 152 extends along the third direction D3.

The shape of the radiation port 15C is, for example, a rectangular shape. In addition, the radiation port 15C is positioned above the radiation chamber 15A and below the heating cooking chamber 100A. Specifically, the radiation port 15C is positioned at substantially a center portion of the bottom wall 1D. The rotary antenna 153 is accommodated in the radiation chamber 15A. The antenna motor 154 drives the rotary antenna 153. The rotary antenna 153 agitates microwaves and supplies the microwaves to the heating cooking chamber 100A through the radiation port 15C.

The partitioning member 15B covers the radiation port 15C. The partitioning member 15B may be required to have a shape that can cover the radiation port 15C. The partitioning member 15B is preferably a plate-like member. Further, when viewed in the up-down direction, the shape of the partitioning member 15B is, for example, a rectangular shape.

The material of the partitioning member 15B is a non-metal, and includes ceramic or glass, for example. As a result of the material of the partitioning member 15B including the ceramic or glass, the partitioning member 15B transmits microwaves. On the other hand, the material of each of the radiation chamber 15A and the waveguide 152 includes a metal.

Figure 6:
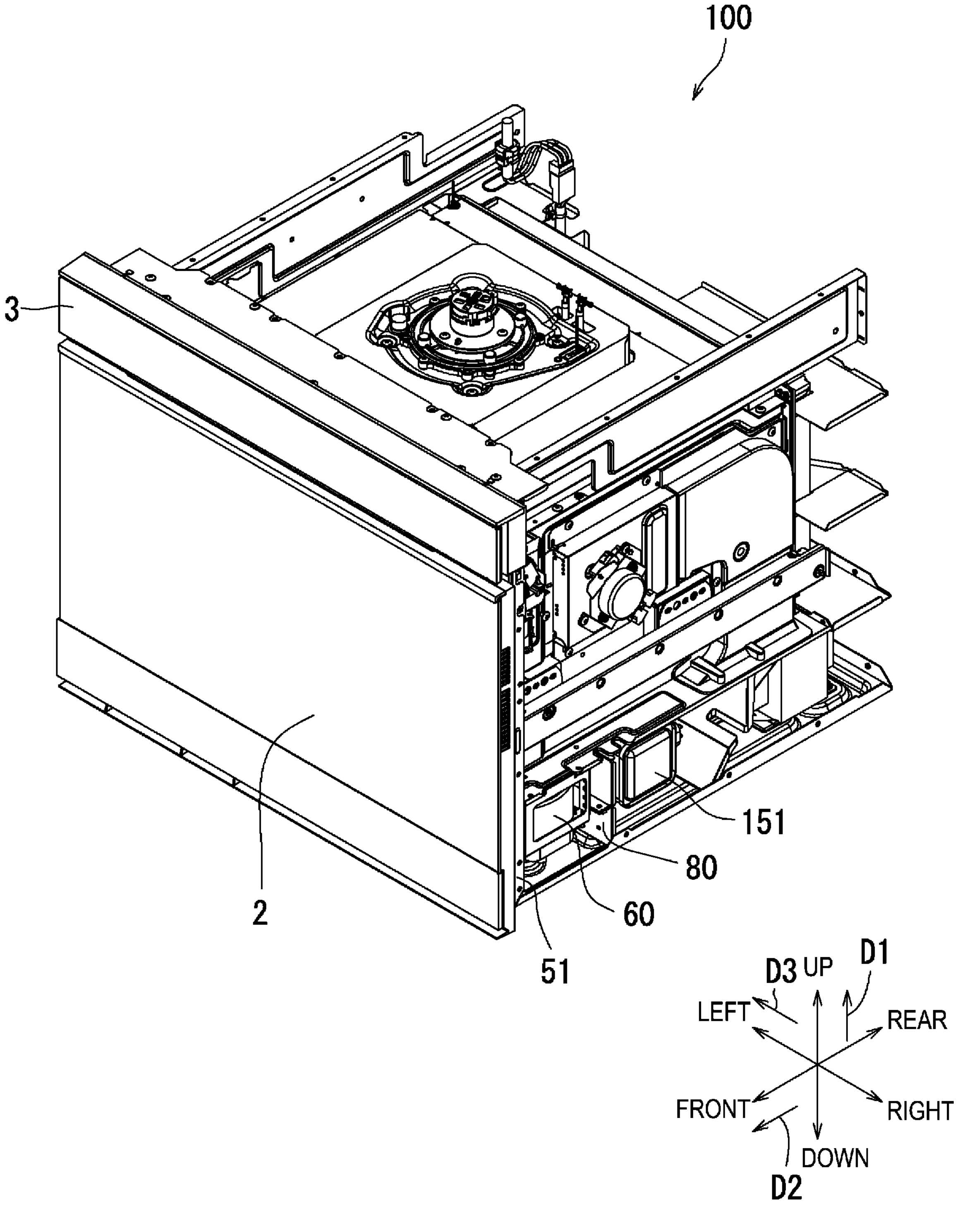
FIG. 6 is a perspective view illustrating the pull-out type heating cooking apparatus according to the present embodiment.
Figure 7:
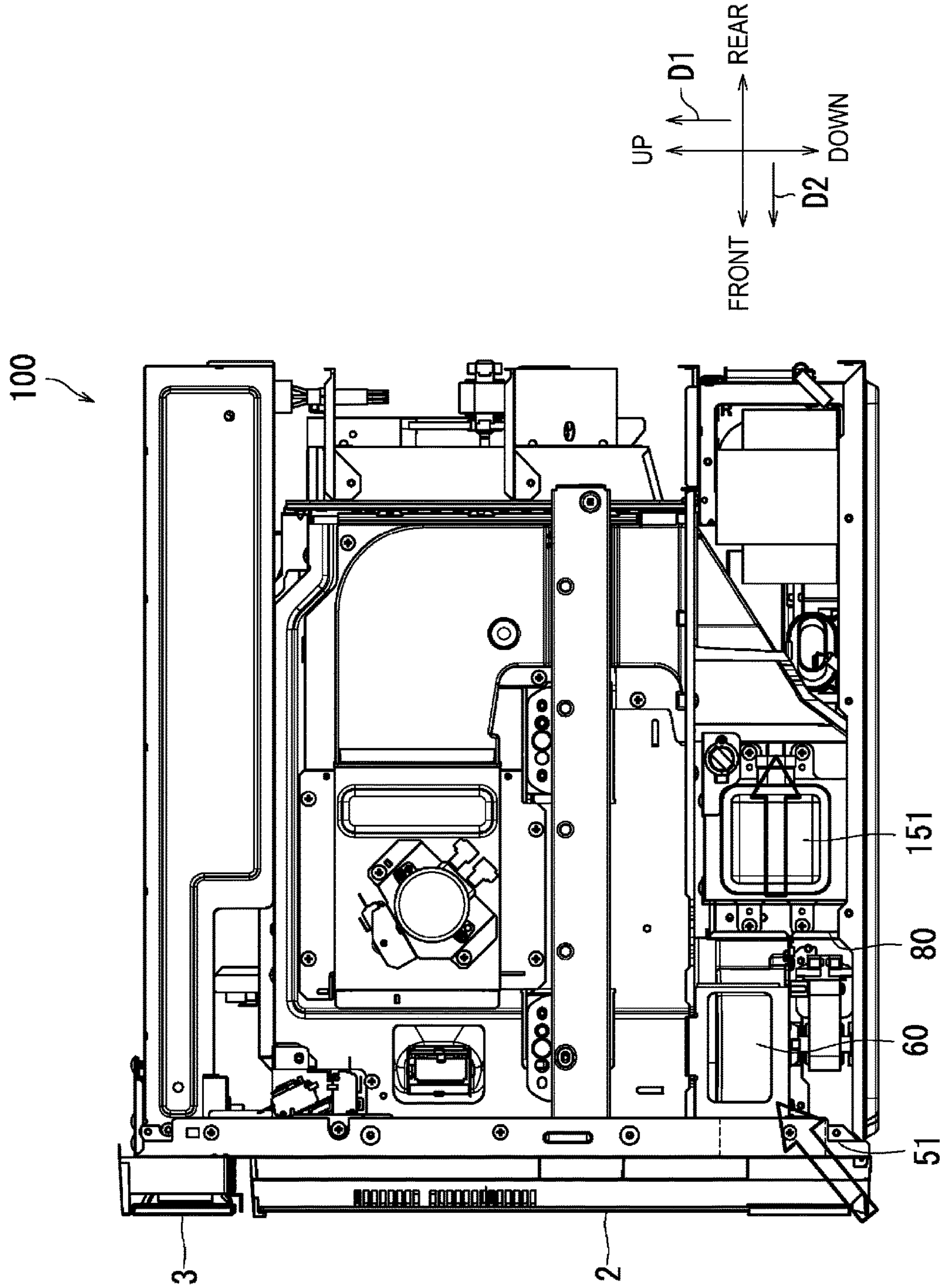
FIG. 7 is a right side view illustrating the pull-out type heating cooking apparatus according to the present embodiment.

Next, an air blowing mechanism 60 will be described with reference to FIG. 6 and FIG. 7. FIG. 6 is a perspective view illustrating the pull-out type heating cooking apparatus 100 according to the present embodiment. FIG. 7 is a right side view illustrating the pull-out type heating cooking apparatus 100 according to the present embodiment. More specifically, FIG. 6 and FIG. 7 illustrate the pull-out type heating cooking apparatus 100 from which the right outer wall 1G, the left outer wall 1H, the top outer wall 1J, the bottom outer wall 1F, and the back outer wall 1K are detached.

As illustrated in FIG. 6 and FIG. 7, the right outer wall 1G, the left outer wall 1H, the top outer wall 1J, the bottom outer wall 1F, and the back outer wall 1K can be attached to and detached from the pull-out type heating cooking apparatus 100. Specifically, an operator uses screws to attach and detach the right outer wall 1G, the left outer wall 1H, the top outer wall 1J, the bottom outer wall 1F, and the back outer wall 1K.

The pull-out type heating cooking apparatus 100 further includes the air blowing mechanism 60 and a fixing member 80. The fixing member 80 is fixed to the heating chamber 1. Specifically, the fixing member 80 is fixed below the heating cooking chamber 100A. More specifically, the fixing member 80 is fixed below the heating cooking chamber 100A by a screw. The fixing member 80 is disposed in the space R between the bottom wall 1D and the bottom outer wall 1F.

The air blowing mechanism 60 blows air onto the microwave supply unit 15. Specifically, the air blowing mechanism 60 blows air onto the magnetron 151.

More specifically, the air blowing mechanism 60 is disposed between the panel 51 and the magnetron 151. The air blowing mechanism 60 sucks the air from the outside of the heating chamber 1 through an opening portion of the panel 51, and also blows out the air toward the magnetron 151. The air blown out from the air blowing mechanism 60 moves along the magnetron 151. In other words, the air blowing mechanism 60 blows out the air in the direction opposite to the second direction D2.

Figure 8:
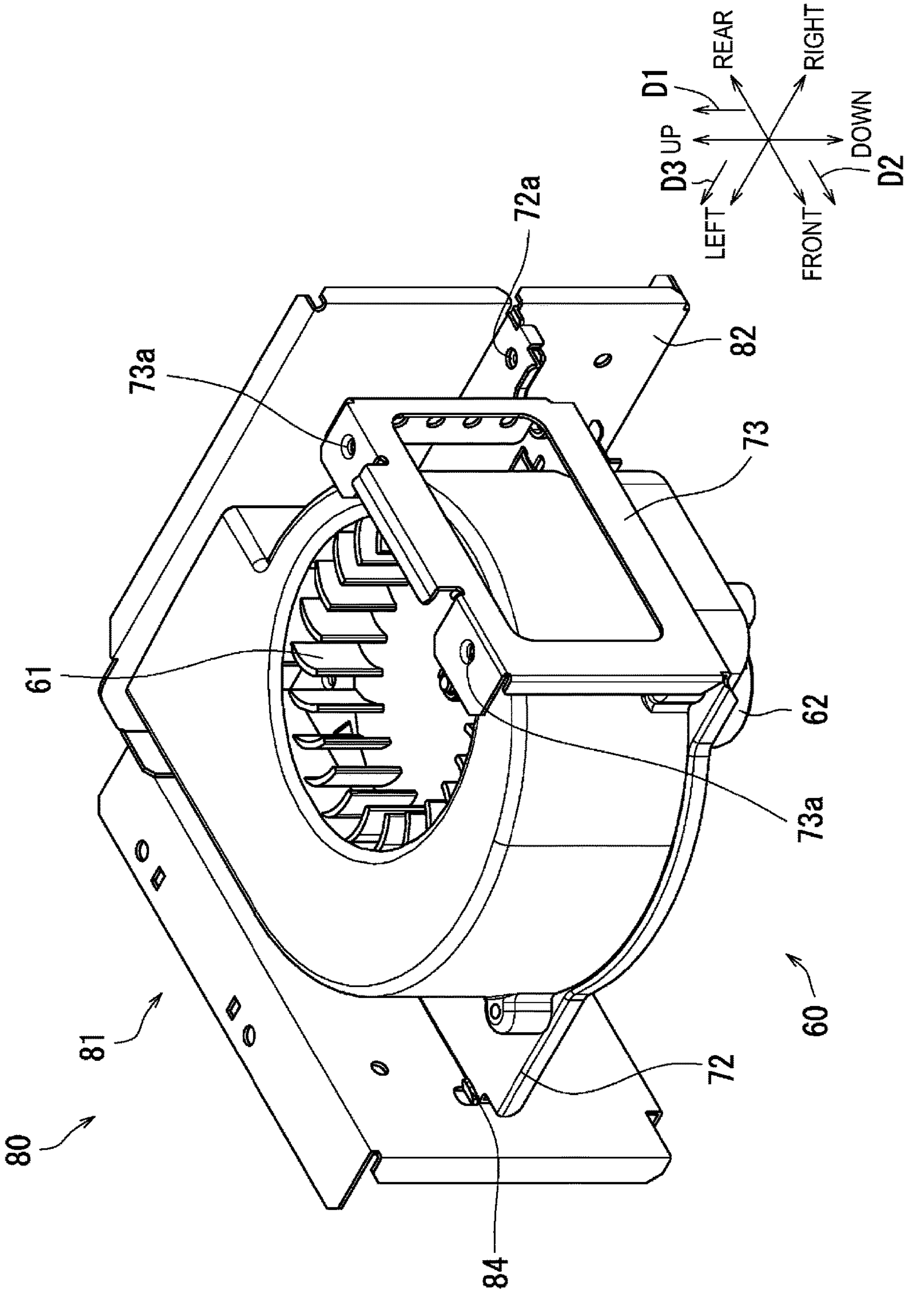
FIG. 8 is a perspective view illustrating an air blowing mechanism and a fixing member according to the present embodiment.
Figure 9:
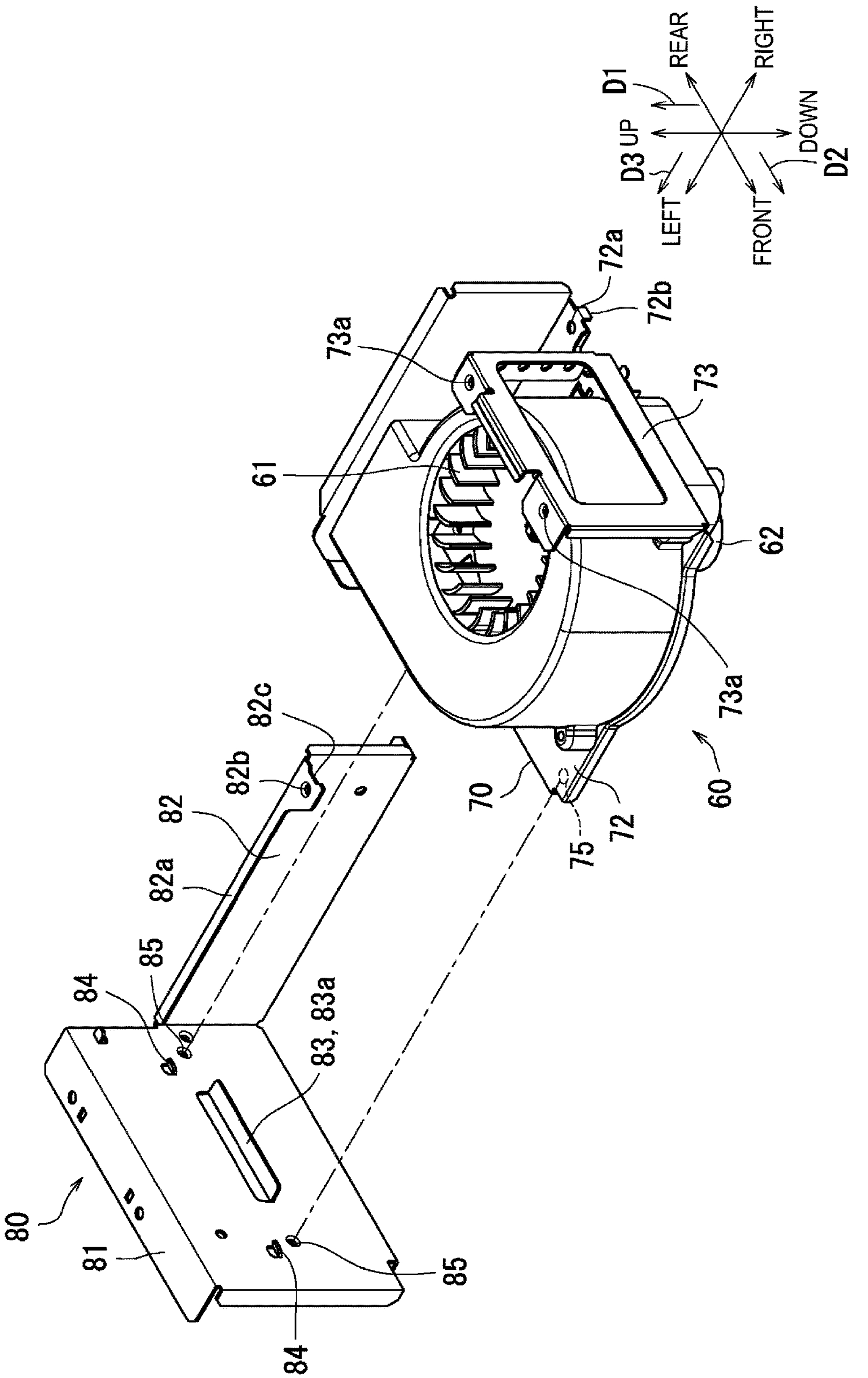
FIG. 9 is a perspective view illustrating the air blowing mechanism and the fixing member according to the present embodiment.
Figure 10:
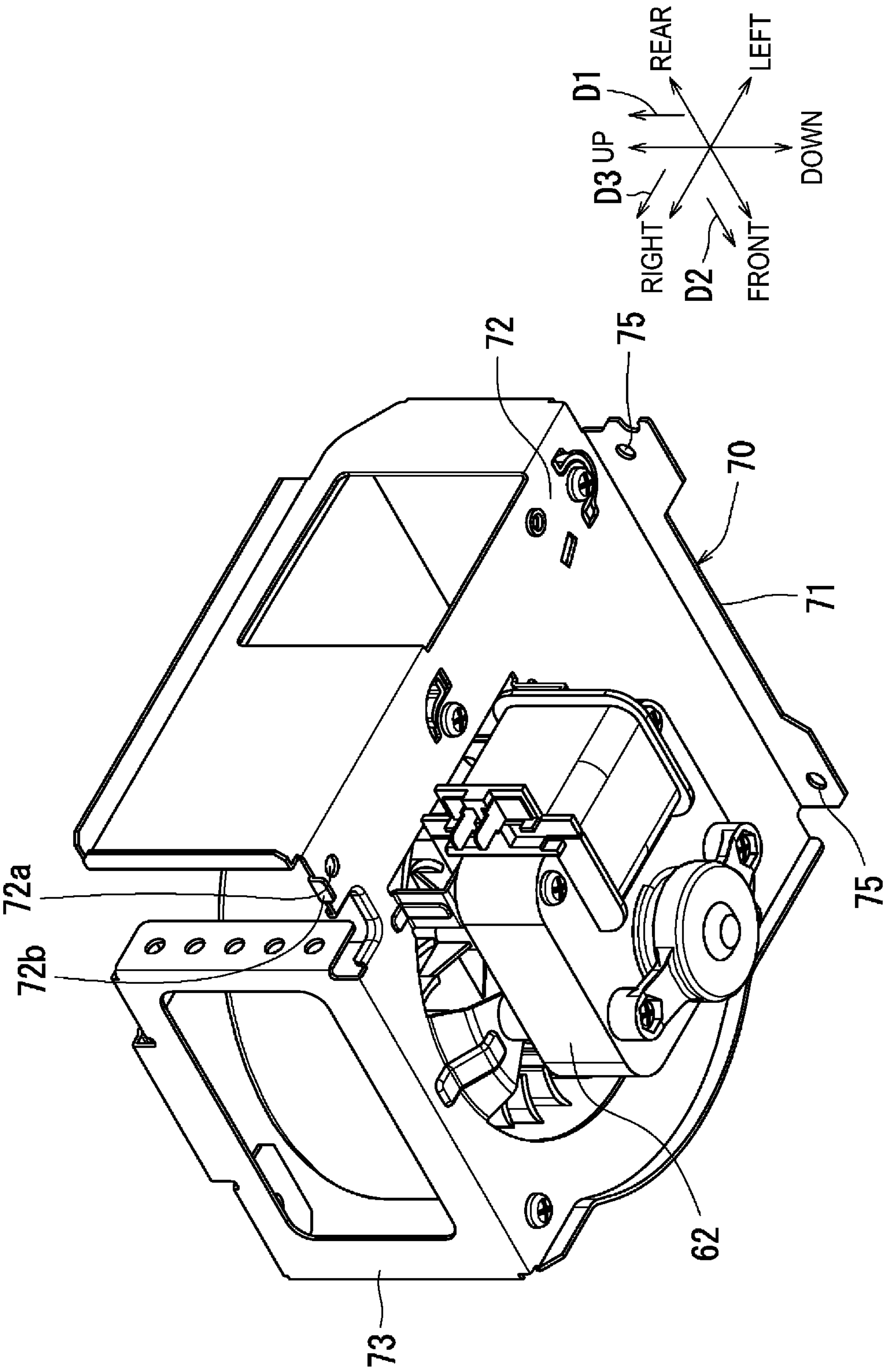
FIG. 10 is a perspective view illustrating the air blowing mechanism according to the present embodiment.

Next, the air blowing mechanism 60 will be described in detail with reference to FIG. 8 to FIG. 10. FIG. 8 and FIG. 9 are perspective views illustrating the air blowing mechanism 60 and the fixing member 80 according to the present embodiment. More specifically, FIG. 8 is a perspective view illustrating the air blowing mechanism 60 attached to the fixing member 80. On the other hand, FIG. 9 is a perspective view illustrating the air blowing mechanism 60 detached from the fixing member 80. Further, FIG. 10 is a perspective view illustrating the air blowing mechanism 60 detached from the fixing member 80. As illustrated in FIG. 8 and FIG. 9, the fixing member 80 includes a first plate 81 and a second plate 82.

The first plate 81 extends along the first direction D1 and the second direction D2. Specifically, the first plate 81 is orthogonal to the third direction D3. The first plate 81 includes an attachment portion 85. Specifically, the first plate 81 includes two attachment portions 85. Each of the two attachment portions 85 is, for example, a screw hole. Each of the two attachment portions 85 passes through along the third direction D3. A screw can be attached to and detached from each of the two attachment portions 85.

The second plate 82 is orthogonal to the second direction D2. More specifically, the second plate 82 extends from the first plate 81 along the direction opposite to the third direction D3. Specifically, the second plate 82 extends along the direction opposite to the third direction D3 from the side, in the direction opposite to the second direction D2, of the first plate 81. Further, the height of the second plate 82 is lower than the height of the first plate 81.

Meanwhile, the air blowing mechanism 60 includes a fan 61 and a motor 62. In the present embodiment, the air blowing mechanism 60 further includes a first attachment member 70. In other words, the air blowing mechanism 60 is unitized.

The fan 61 includes an exhaust hole on the side in the direction opposite to the second direction D2. The fan 61 further includes an air intake hole on the side in the direction opposite to the first direction D1. The fan 61 is, for example, a sirocco fan. The motor 62 drives the fan 61. The motor 62 is disposed below the fan 61.

The first attachment member 70 is disposed on the third direction D3 side of the fan 61. Further, the first attachment member 70 is disposed below the fan 61. The first attachment member 70 includes an attachment portion 75. Specifically, the first attachment member 70 includes two attachment portions 75. Each of the two attachment portions 75 is, for example, a screw hole. Each of the two attachment portions 75 passes through along the third direction D3. A screw can be attached to and detached from each of the two attachment portions 75. The two attachment portions 75 are fixed to the two attachment portions 85 with screws, respectively.

In the present embodiment, the fixing member 80 further includes a support portion 83. The support portion 83 supports the first attachment member 70. Specifically, the support portion 83 includes a horizontal plate 83*a* disposed on the side, in the direction opposite to the third direction D3, of the first plate 81. The first attachment member 70 is placed on the horizontal plate 83*a*.

As described above with reference to FIG. 1 to FIG. 10, the air blowing mechanism 60 includes the first attachment member 70, and the fixing member 80 is fixed to the heating chamber 1. Since the support portion 83 of the fixing member 80 supports the first attachment member 70, the air blowing mechanism 60 can be restricted from moving downward with respect to the fixing member 80. In other words, in a state in which the support portion 83 supports the first attachment member 70, the operator can attach and detach the air blowing mechanism 60 to and from the fixing member 80. As a result, the operator can easily attach and detach the air blowing mechanism 60 to and from the fixing member 80. For example, the operator can easily fix the attachment portion 75 of the first attachment member 70 and the attachment portion 85 of the fixing member 80 with a screw using a screwdriver, without supporting the air blowing mechanism 60. Further, the operator can attach and detach the air blowing mechanism 60 to and from the fixing member 80 within a short period of time.

Further, even when the fixing member 80 is fixed below the heating cooking chamber 100A, the operator can easily attach and detach the air blowing mechanism 60 to and from the fixing member 80. For example, the operator can insert the screwdriver between the bottom wall 1D and the bottom outer wall 1F and fix the attachment portion 75 and the attachment portion 85 with the screw, without supporting the air blowing mechanism 60.

More specifically, the first attachment member 70 further includes an engagement portion 71. Specifically, the engagement portion 71 is a recessed portion recessed toward the first direction D1. More specifically, the engagement portion 71 is a recessed portion that becomes smaller toward the first direction D1. The shape of the recessed portion is, for example, a trapezoid.

The horizontal plate 83*a* engages with the engagement portion 71. Specifically, the horizontal plate 83*a* is disposed in the recessed portion. As a result, the air blowing mechanism 60 is disposed at a predetermined position with respect to the fixing member 80. Thus, the operator can more easily attach and detach the air blowing mechanism 60 to and from the fixing member 80.

More specifically, the fixing member 80 further includes an inclined plate 84. Specifically, the fixing member 80 further includes two inclined plates 84. Each of the two inclined plates 84 is disposed on the side, in the direction opposite to the third direction D3, of the first plate 81. Further, each of the two inclined plates 84 is disposed above the horizontal plate 83*a*. Further, one of the two inclined plates 84 is disposed further in the second direction D2 than the horizontal plate 83*a*. The other of the two inclined plates 84 is disposed further in the direction opposite to the second direction D2 than the horizontal plate 83*a*. Each of the two inclined plates 84 is inclined toward the horizontal plate 83*a*.

The first attachment member 70 is disposed between the horizontal plate 83*a* and the two inclined plates 84. More specifically, when the operator attaches the air blowing mechanism 60 to the fixing member 80, if the first attachment member 70 moves toward the third direction D3, the two inclined plates 84 guide the first attachment member 70 toward the horizontal plate 83*a*. As a result, the operator can easily dispose the air blowing mechanism 60 at the predetermined position with respect to the fixing member 80.

More specifically, the fixing member 80 further includes a placing portion 82*a*. The placing portion 82*a* is disposed at the upper end of the second plate 82. The placing portion 82*a* extends from the upper end of the second plate 82 toward the second direction D2. The placing portion 82*a* is, for example, a horizontal plate. Further, an attachment portion 82*b* is disposed on the side, in the direction opposite to the third direction D3, of the placing portion 82*a*. The attachment portion 82*b* is, for example, a screw hole. The attachment portion 82*b* passes through along the first direction D1. A screw can be attached to and detached from the attachment portion 82*b*. Further, the placing portion 82*a* includes a recessed portion 82*c* disposed on the side, in the direction opposite to the third direction D3, of the placing portion 82*a*. The recessed portion 82*c* is recessed toward the third direction D3.

Meanwhile, the air blowing mechanism 60 further includes a second attachment member 72. The second attachment member 72 extends from the first attachment member 70 along the direction opposite to the third direction D3. Specifically, the second attachment member 72 extends from the upper end of the first attachment member 70 along the direction opposite to the third direction D3. The second attachment member 72 is, for example, a horizontal plate. Further, an attachment portion 72*a* is disposed on the side, in the direction opposite to the third direction D3, of the second attachment member 72. The attachment portion 72*a* is, for example, a screw hole. The attachment portion 72*a* passes through along the first direction D1. A screw can be attached to and detached from the attachment portion 72*a*. Further, the second attachment member 72 includes a protruding portion 72*b* disposed on the side, in the direction opposite to the third direction D3, of the second attachment member 72. The protruding portion 72*b* protrudes downward.

The second attachment member 72 is placed on the placing portion 82*a*. As a result, even when the operator releases his/her hand from the air blowing mechanism 60, the air blowing mechanism 60 is maintained at the predetermined position with respect to the fixing member 80. Thus, the operator can easily attach and detach the air blowing mechanism 60 to and from the fixing member 80. Further, the protruding portion 72*b* is disposed in the recessed portion 82*c*. Furthermore, the air blowing mechanism 60 can be firmly fixed to the fixing member 80 by fixing the attachment portion 82*b* and the attachment portion 72*a* with a screw. As a result, when the air blowing mechanism 60 is driven, vibration of the air blowing mechanism 60 can be suppressed.

More specifically, the air blowing mechanism 60 further includes a third attachment member 73. The third attachment member 73 is disposed on the side, in the direction opposite to the third direction D3, of the fan 61. The third attachment member 73 is, for example, a rectangular frame body. The third attachment member 73 is orthogonal to the third direction D3. An attachment portion 73*a* is disposed at the upper end of the third attachment member 73. Specifically, two attachment portions 73*a* are disposed at the upper end of the third attachment member 73. Each of the two attachment portions 73*a* is, for example, a screw hole. Each of the two attachment portions 73*a* passes through along the first direction D1. A screw can be attached to and detached from each of the two attachment portions 73*a*.

The third attachment member 73 is attached to the heating chamber 1. As a result, the air blowing mechanism 60 can be firmly fixed to the fixing member 80. Thus, when the air blowing mechanism 60 is driven, the vibration of the air blowing mechanism 60 can be suppressed. Specifically, the two attachment portions 73*a* are attached to the heating chamber 1.

Figure 11:
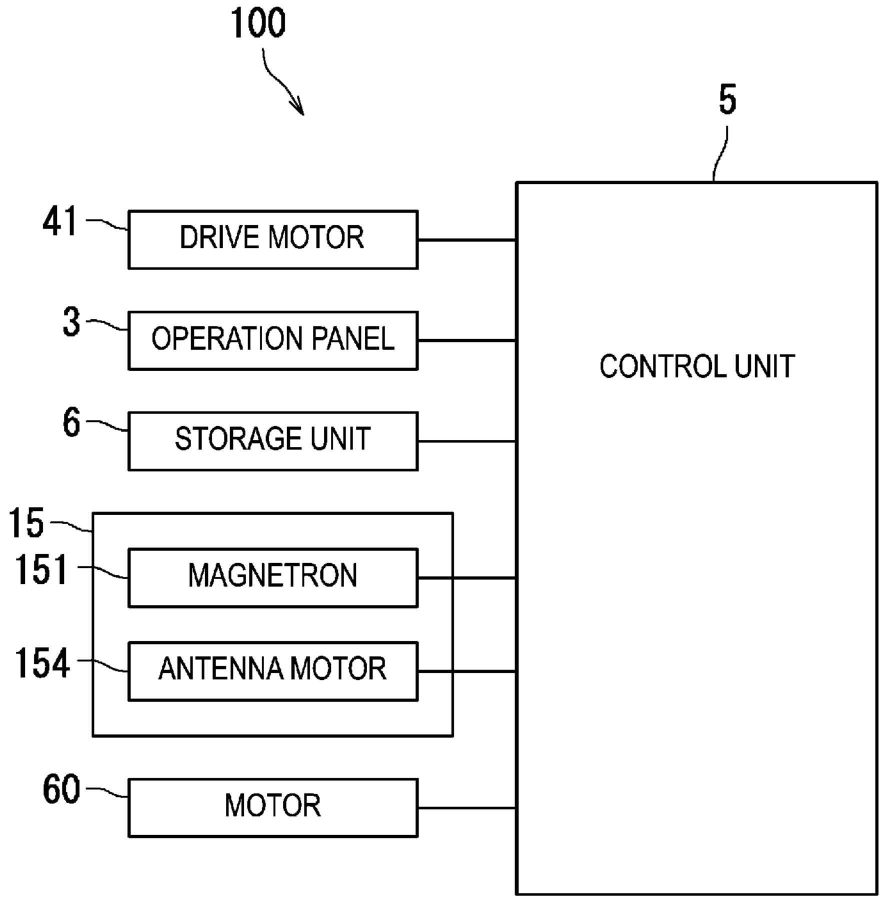
FIG. 11 is a block diagram illustrating a configuration of the pull-out type heating cooking apparatus according to the present embodiment.

Next, a configuration of the pull-out type heating cooking apparatus 100 will be described in detail with reference to FIG. 11. FIG. 11 is a block diagram illustrating the configuration of the pull-out type heating cooking apparatus 100.

As illustrated in FIG. 11, the control unit 5 controls the magnetron 151, the antenna motor 154, the drive motor 41, the operation panel 3, the motor 62, and the storage unit 6 by executing the control programs stored in the storage unit 6.

Figure 12:
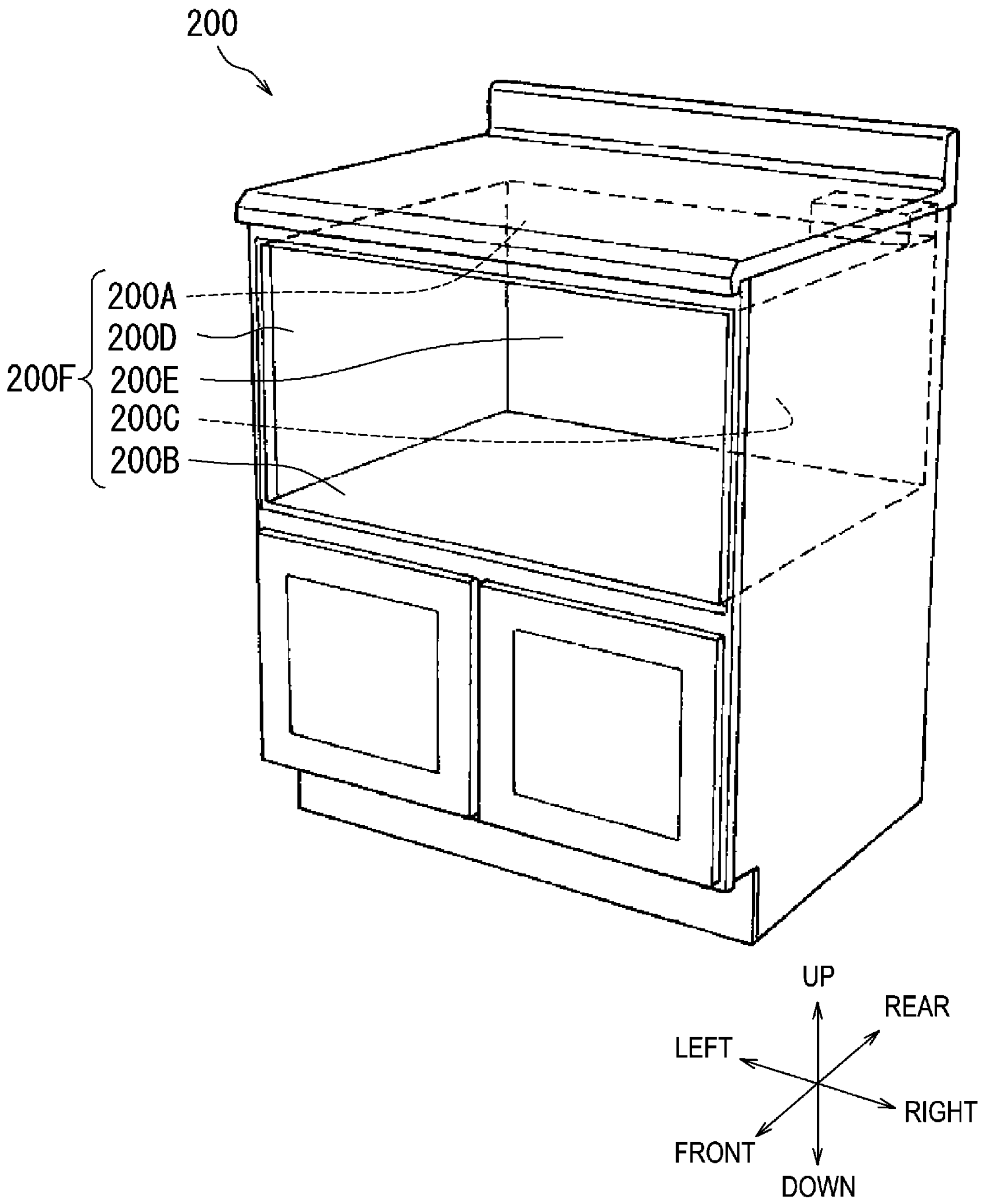
FIG. 12 is a perspective view illustrating a cabinet to which the pull-out type heating cooking apparatus according to the present embodiment is attached.

Next, a cabinet 200 to which the pull-out type heating cooking apparatus 100 is attached will be described with reference to FIG. 12. FIG. 12 is a perspective view illustrating the cabinet 200 to which the pull-out type heating cooking apparatus 100 is attached.

As illustrated in FIG. 12, the pull-out type heating cooking apparatus 100 is attached to and installed in the cabinet 200. The cabinet 200 includes an upper wall 200A, a lower wall 200B, a right wall 200C, a left wall 200D, and a rear wall 200E. The upper wall 200A, the lower wall 200B, the right wall 200C, the left wall 200D, and the rear wall 200E form an accommodation portion 200F. The accommodation portion 200F is a rectangular parallelepiped space into which the pull-out type heating cooking apparatus 100 is fitted.

The embodiment of the present invention has been described above with reference to the accompanying drawings. However, the present invention is not limited to the embodiment described above, and the present invention can be implemented in various modes without departing from the gist thereof. The drawings primarily schematically illustrate each of the constituent elements for the sake of easier understanding, and the thickness, length, quantity, and the like of each of the illustrated constituent elements are different from the actual thickness, length, quantity, and the like by reason of creation of the drawings. Further, the material, shape, dimensions, and the like of each of the constituent elements illustrated in the embodiment described above are merely examples and are not particularly limited, and various modifications can be made within the scope not substantially departing from the effects of the present invention.

(1) As described with reference to FIG. 1 to FIG. 12, the pull-out type heating cooking apparatus 100 includes the microwave supply unit 15, but the present invention is not limited thereto. For example, the pull-out type heating cooking apparatus 100 may further include an air blowing unit that blows hot air onto the heating cooking chamber 100A. Further, the pull-out type heating cooking apparatus 100 may further include a heater disposed in the heating cooking chamber 100A.

(2) As described with reference to FIG. 1 to FIG. 12, the two attachment portions 75 are fixed to the two attachment portions 85 with the screws, respectively, but the present invention is not limited thereto. For example, the two attachment portions 75 may be fixed to the two attachment portions 85 with pins, respectively. Further, the two attachment portions 75 may be protrusions and the two attachment portions 85 may be holes, or the two attachment portions 85 may be protrusions and the two attachment portions 75 may be holes.

INDUSTRIAL APPLICABILITY

The present invention provides a heating cooking apparatus, and the provided heating cooking apparatus has industrial applicability.

REFERENCE SIGNS LIST

1 Heating chamber
15 Microwave supply unit
60 Air blowing mechanism
61 Fan
62 Motor
70 First attachment member
80 Fixing member
83 Support portion
85 Attachment portion
100 Pull-out type heating cooking apparatus
D3 Third direction (predetermined direction)

The invention claimed is:

1. A heating cooking apparatus comprising:
a heating cooking unit including a heating cooking chamber;
a magnetron configured to supply microwaves to the heating cooking chamber;
an air blowing mechanism configured to blow air onto the magnetron; and
a fixing member fixed to the heating cooking unit,
wherein the air blowing mechanism includes:
a fan,
a motor configured to drive the fan, and
a first attachment member disposed on a side of the fan in a predetermined direction, and the fixing member includes:
a support portion configured to support the first attachment member,
an attachment portion to which the first attachment member is attached,
a first plate extending along a vertical direction, and
a second plate extending from the first plate along a direction opposite the predetermined direction, the air blowing mechanism placed on the second plate,
the support portion includes a horizontal plate disposed on a side of the first plate in the direction opposite the predetermined direction, and
the first attachment member includes an engagement portion configured to engage with the horizontal plate.

2. A heating cooking apparatus, comprising:
a heating cooking unit including a heating cooking chamber;
a magnetron configured to supply microwaves to the heating cooking chamber;
an air blowing mechanism configured to blow air onto the magnetron; and
a fixing member fixed to the heating cooking unit,
wherein the air blowing mechanism includes:
a fan,
a motor configured to drive the fan, and
a first attachment member disposed on a side of the fan in a predetermined direction,
the fixing member includes:
a support portion configured to support the first attachment member,
an attachment portion to which the first attachment member is attached,
a first plate extending along a vertical direction, and
a second plate extending from the first plate along a direction opposite the predetermined direction,
the support portion includes a horizontal plate disposed on a side of the first plate in the direction opposite the predetermined direction,
the first attachment member includes an engagement portion configured to engage with the horizontal plate,
the fixing member further includes an inclined plate disposed on the side of the first plate in the direction opposite the predetermined direction and inclined toward the horizontal plate, and
the first attachment member is disposed between the horizontal plate and the inclined plate.

3. A heating cooking apparatus comprising:
a heating cooking unit including a heating cooking chamber;
a magnetron configured to supply microwaves to the heating cooking chamber;
an air blowing mechanism configured to blow air onto the magnetron; and
a fixing member fixed to the heating cooking unit,
wherein the air blowing mechanism includes:
a fan,
a motor configured to drive the fan, and
a first attachment member disposed on a side of the fan in a predetermined direction,
the fixing member includes:
a support portion configured to support the first attachment member,
an attachment portion to which the first attachment member is attached,
a first plate extending along a vertical direction, and
a second plate extending from the first plate along a direction opposite the predetermined direction,
the support portion includes a horizontal plate disposed on a side of the first plate in the direction opposite the predetermined direction,
the first attachment member includes an engagement portion configured to engage with the horizontal plate,
the fixing member further includes a placing portion disposed at an upper end of the second plate,
the air blowing mechanism further includes a second attachment member extending from the first attachment member along the direction opposite the predetermined direction, and
the second attachment member is placed on the placing portion.

4. The heating cooking apparatus according to claim 3,
wherein the second attachment member includes a protruding portion protruding downward and disposed on a side of the second attachment member in the direction opposite the predetermined direction,
the placing portion includes a recessed portion recessed toward the predetermined direction and disposed on a side of the placing portion in the direction opposite the predetermined direction, and
the protruding portion is disposed in the recessed portion.

5. The heating cooking apparatus according to claim 3, wherein the air blowing mechanism further includes a third attachment member disposed on another side of the fan in the direction opposite the predetermined direction, and the third attachment member is attached to the heating cooking unit.

* * * * *